United States Patent
Dienhart et al.

(10) Patent No.: US 6,430,950 B1
(45) Date of Patent: Aug. 13, 2002

(54) EXPANSION ELEMENT AND A VALVE UNIT USABLE THEREFOR

(75) Inventors: Ing. Bernd Dienhart, Cologne; Hans-Joachim Krauss, Stuttgart; Hagen Mittelstrass, Bondorf; Karl-Heinz Staffa; Christoph Walter, both of Stuttgart; Jan Hinrichs, Friedrichsdorf; Volker Seipel, Bensheim; Nguyen van Doan, Neu-Anspach, all of (DE)

(73) Assignees: Behr GmbH & Co., Stuttgart; Luk Fahrzeughydraulic GmbH & Co. KG, Bad Homburg, both of (DE)

( * ) Notice: Subject to any disclaimer, the term of this patent is extended or adjusted under 35 U.S.C. 154(b) by 0 days.

(21) Appl. No.: 09/438,390

(22) Filed: Nov. 12, 1999

(30) Foreign Application Priority Data

Nov. 12, 1998  (DE) ......................... 198 52 127

(51) Int. Cl.$^7$ ............................. F25B 41/04
(52) U.S. Cl. ............ 62/222; 62/225; 62/511
(58) Field of Search ............ 62/222, 224, 511, 62/225; 138/45, 46

(56) References Cited

U.S. PATENT DOCUMENTS

| | | | | |
|---|---|---|---|---|
| 2,654,976 A | * | 10/1953 | Jorgensen | 62/224 |
| 3,150,502 A | * | 9/1964 | Tucker | 62/511 |
| 3,252,294 A | * | 5/1966 | Heidorn | 62/224 |
| 3,285,030 A | * | 11/1966 | Coyne | 62/511 |
| 4,032,070 A | | 6/1977 | Nielsen | |
| 4,236,669 A | * | 12/1980 | Kountz | 62/224 |
| 4,951,478 A | * | 8/1990 | McDonald | 62/222 |
| 5,117,647 A | | 6/1992 | Valbjern | |
| 5,195,331 A | | 3/1993 | Zimmern | |
| 5,642,858 A | | 7/1997 | Kakehashi | |

FOREIGN PATENT DOCUMENTS

| | | | | |
|---|---|---|---|---|
| DE | 1075646 | * | 2/1960 | ............ 62/224 |
| DE | 3 151 016 | | 7/1983 | |
| DE | 3510776 | | 10/1986 | |
| DE | 4 036 059 | | 5/1992 | |
| DE | 4 341 579 | | 8/1994 | |
| EP | 0279622 | | 8/1988 | |
| EP | 0283323 | | 8/1988 | |
| EP | 0 438 625 | | 7/1991 | |
| EP | 0 701 096 | | 3/1996 | |
| EP | 0 786 632 | | 7/1997 | |
| EP | 0837291 | | 4/1998 | |
| WO | 9924746 | | 5/1999 | |

OTHER PUBLICATIONS

Copy of the search report.
Patent Abstracts of Japan JP 58–146778 A, M–259, Nov. 30, 1983, vol. 7, No. 269.
Veith, Heinz: Grundkursus der Kältetechnik, Verlag C.F. Mueller, Karlsruhe, 1971, Bd. 4, S.254,255, Bild 47.

* cited by examiner

Primary Examiner—William E. Tapolcai
(74) Attorney, Agent, or Firm—Crowell & Moring LLP

(57) ABSTRACT

An expansion element for a $CO_2$ motor vehicle air conditioner includes a valve unit which can be used particularly for such an expansion element and which has a fixed throttle between an upstream valve high-pressure side and a downstream valve low-pressure side. The expansion element contains a control valve which is acted upon by the low-pressure-side refrigerant pressure or a physical quantity connected therewith as the correcting variable, or valve unit. The valve unit contains a fixed throttle and at least one additional valve component in the form of a pressure control valve which is arranged in a bypass line bypassing the fixed throttle, or in the form of a control vale influencing the passage cross-section of the fixed throttle.

11 Claims, 3 Drawing Sheets

EXPANSION ELEMENT AND A VALVE UNIT USABLE THEREFOR

BACKGROUND OF THE INVENTION

This application claims the priority of German application 198 52 127.8, filed Nov. 12, 1998, the disclosure of which is expressly incorporated by reference herein.

The present invention relates to an expansion element for an air conditioner and to a valve unit which can be used particularly for such an expansion element and has a fixed throttle between an upstream valve high-pressure side and a downstream valve low- pressure side.

Air conditioners, as used, for example, in motor vehicles, conventionally contain a refrigerant circulating system which is divided, on one hand, by a compressor and, on the other hand, by an expansion element into a refrigerant high-pressure side and a refrigerant low-pressure side. On the high-pressure side, between the compressor and the expansion element, a heat exchanger is situated for cooling the refrigerant. The heat exchanger operates as a condenser or a gas cooler depending on whether the refrigerant on the high-pressure side is operated in the subcritical or supercritical range.

On the low-pressure side, between the expansion element and the compressor an evaporator is situated over which an air current to be cooled is guided. Conventional expansion elements usually contain a control valve which variably adjusts the passage cross-section of the expansion element as a function of an influencing correcting variable. Typically, the overheating of the refrigerant behind the evaporator is controlled by influencing the refrigerant flow rate. Thus, EP 0 438 625 A2 describes an expansion element with a control valve for which the low-pressure-side refrigerant temperature behind the evaporator is used as a correcting variable.

EP 0 701 096 A2 discloses a vehicle air conditioner which operates preferably with $CO_2$ as the refrigerant. Either a fixed throttle or a control valve is provided as the expansion element. When the control valve is used, a so-called COP control of the $CO_2$ air conditioner is endeavored. The coefficient of performance (COP), defined as the ratio of the supplied cooling output to the spent power, if possible, is held within the range of a maximum which the COP assumes as a function of the refrigerant pressure on the high-pressure side. For this purpose, the adjustment of the control valve is correlated with the control of a throughput-controllable compressor, whereby the refrigerant flow rate is varied by regulating the refrigerant throughput in the compressor.

EP 0 786 632 A2 discloses a $CO_2$ air conditioner with an expansion element which contains a control valve which is acted upon by the high-pressure-side refrigerant pressure. The differential pressure, which acts upon a movable membrane and which exists between the high-pressure-side refrigerant pressure and the pressure in a closed chamber which is filled with refrigerant and is in a thermal contact with the high-pressure-side refrigerant flowing past, operates as the effective correcting variable. In this manner, the high-pressure-side refrigerant pressure can be varied along a curve which, in the supercritical range, corresponds to a curve of constant refrigerant density, whereby the COP again is to be kept at a maximum.

SUMMARY OF THE INVENTION

An object of the present invention is to provide a novel valve unit which, when used in an expansion element for an air conditioner, particularly a $CO_2$ air conditioner, which, on the high-pressure side, also reaches the supercritical range of the used refrigerant, permits a comparatively reliable and energy-optimal control of the refrigerant circulation at relatively low expenditures. The present invention is also based on a novel expansion element by which particularly also a $CO_2$ air conditioner can be controlled in a comparatively easy and reliable manner.

The present invention achieves these objects by providing a valve unit having a fixed throttle between a valve high-pressure side and a valve low-pressure side, and at least one additional component comprising one of a pressure control valve arranged in a bypass line bypassing the fixed throttle and of a control valve influencing the passage cross-section of the fixed throttle, as well as an expansion element having a control valve configured to adjust a flow cross-section of the refrigerant from the high-pressure side to the low-pressure side as a function of an effective correcting variable and to be acted upon by the refrigerant pressure on the low-pressure side or a physical quantity connected therewith as the correcting variable or an expansion element characterized by a valve unit, or configured to be coupled on the valve high-pressure side to a condenser, gas cooler or internal heat exchanger of the air conditioner and on the valve low-pressure side to a low-pressure-side refrigerant flow section of the air conditioner.

The valve unit according to the present invention characteristically contains a fixed throttle between the valve high-pressure side and the valve low-pressure side as well as at least one additional valve component in the form of a pressure control valve which is arranged in a bypass line bypassing the fixed throttle, or in the form of a control valve which influences the passage cross-section of the fixed throttle.

The combined arrangement of the fixed throttle and the pressure control valve is suitable for use as an expansion element, which can be implemented in a comparatively easy manner, specifically also of a $CO_2$ air conditioner which can be operated supercritically on the high-pressure side at least in certain operating situations. The fixed throttle saves the control expenditures which are connected with a control valve and, because of its pressure-dependent throttle characteristic, nevertheless to a certain extent permits a high pressure regulating. The pressure control valve acted upon by the high-pressure-side refrigerant pressure provides a high-pressure safety limitation and is advantageously arranged in an associated bypass line so that it does not at all affect the refrigerant flow through the fixed throttle.

As required, the use of a control valve influencing the passage cross-section of the fixed throttle permits control of the air conditioner which is refined in comparison to the sole use of an uncontrolled fixed throttle. Nevertheless, also in this case, the implementation and control expenditures clearly remain lower than when conventional expansion element control valves are used which have no fixed throttle part and have a partially external control.

A further development of the valve unit has a second fixed throttle connected in parallel to the first. The two fixed throttles preferably have different configurations so that, if an expansion element is used in contrast to a sole fixed throttle, a two-step and therefore refined control of a refrigerant circulation is achievable.

In a further development, the valve unit has, in addition to the two parallel fixed throttles, a pressure control valve in a bypass line bypassing the fixed throttle arrangement as well as a control valve which influences the passage cross-section of one of the fixed throttles. This permits a particularly sensitive control of a refrigerant circulating system still without the implementation and control expenditures of a conventional expansion element control valve complex. The reason is that, because of the presence of the fixed throttles, the control valve used here may have a relatively simple construction and must carry out a comparatively simple control function.

In a still further development of the valve according to the present invention, all valve components are advantageously integrated in a common valve housing so that the valve unit with the several valve components can be implemented as a uniform compact constructional unit.

A valve unit according to the present invention can also have a mechanical control valve which influences the passage cross-section of a fixed throttle and which is acted upon by the pressure of the medium on the low-pressure side as the correcting variable. When the valve unit is used in an expansion element, a simple refrigerant high-pressure control is permitted with the low-pressure-side refrigerant pressure, also called suction pressure, as the correcting variable.

In another valve unit embodiment according to the present invention, a thermal control valve influences the passage cross-section of a fixed throttle and is acted upon by the temperature existing on the low-pressure side as the correcting variable. When the valve unit is used in an expansion element of an air conditioner, a refrigerant high-pressure control is permitted with the low-pressure-side refrigerant temperature, also called suction gas temperature, as the correcting variable.

In a further developed valve unit according to the present invention, a thermal control valve is provided which influences the passage cross-section of a fixed throttle and to whom a heater is assigned by which it can be controlled by an associated heater input quantity as the correcting variable. When the valve unit is used, for example, in an expansion element of a vehicle air conditioner, this correcting variable may be an electric heating current signal which depends on the ambient temperature or the rotational speed of a motor vehicle engine driving the air conditioner compressor. In addition, the thermal control valve can also be influenced by the low-pressure-side refrigerant temperature.

In yet a still further developed valve unit, the low-pressure side of the control valve, which can be influenced by a low-pressure-side physical quantity and acts upon a fixed throttle, is connected by a valve-housing-internal connection line directly with the low-pressure side of the fixed throttle. As the result, influencing of the control valve is implemented by the low-pressure side already in the valve unit itself and must no longer be caused externally so that a single low-pressure connection is sufficient for the valve unit.

The expansion element according to the present invention characteristically contains a mechanical control valve which is acted upon by the low-pressure-side refrigerant pressure as the correcting variable. This permits a refrigerant high-pressure control with the low-pressure-side refrigerant pressure in front of or behind the evaporator which, specifically also for $CO_2$ air conditioners of motor vehicles, on one hand, is found to have relatively low expenditures and, on the other hand, is found to be comparatively reliable and favorable in terms of energy consumption.

The expansion element characteristically contains a valve unit of the above-described types coupled on the valve high-pressure side to the refrigerant high-pressure side of the air conditioner and on the valve low-pressure side to the refrigerant low-pressure side of the air conditioner. As a result of the valve components contained in the valve unit, this expansion element permits a reliable air conditioner control in the different operating situations which is advantageous with respect to the energy consumption, meets the output demands and is simple with respect to the control, specifically also of a $CO_2$ vehicle air conditioner with the load fluctuations typical of the use in a vehicle.

In a further developed expansion element according to the present invention, the control valve of the valve unit influencing the passage cross-section of a fixed throttle is arranged with its low-pressure side fluidically either upstream of an evaporator or between the evaporator and a compressor of the air conditioner, in front of or behind a possibly existing internal heat exchanger.

Other objects, advantages and novel features of the present invention will become apparent from the following detailed description of the invention when considered in conjunction with the accompanying drawings.

DETAILED DESCRIPTION OF THE DRAWINGS

Figure 1:
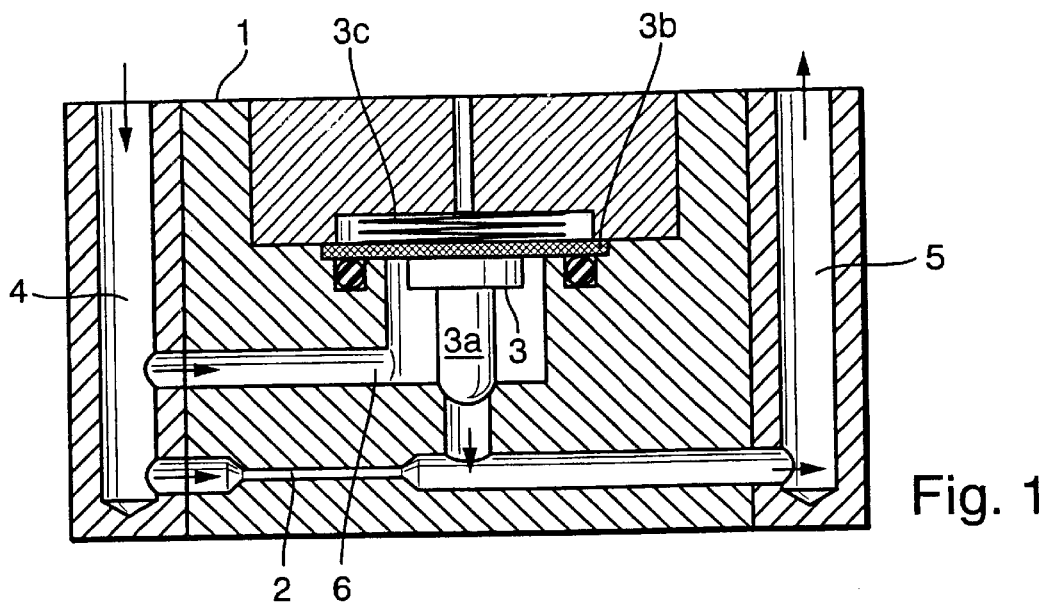
FIG. 1 is a longitudinal sectional view of a valve unit with a fixed throttle and a pressure control valve.

The valve unit illustrated in FIG. 1 contains a fixed throttle 2 and a pressure control valve 3 in a common valve housing 1. The fixed throttle 2, also called a constant throttle or an orifice tube, connects an input-side valve high-pressure side represented by an inlet duct 4 provided in the housing 1 with a valve low-pressure side represented by an outlet duct 5 provided in the housing 1 by way of a throttle duct with an appropriately small passage cross-section, that is, with a length which is several times larger than the diameter. Such a fixed throttle has the characteristic that it allows the pressure on the high-pressure side, or more precisely, the differential pressure between the high-pressure side and the low-pressure side, to rise only to a certain maximal value which depends on the design of the fixed throttle.

If this is no longer possible because of an excessive supply of flow medium or the fixed throttle fails, for example, as the result of clogging, the pressure control valve 3 provided for this purpose prevents a pressure rise on the high-pressure side 4 beyond a permissible value which can be adjusted by the design of the pressure control valve 3. For this purpose, the pressure control valve 3 is situated in a bypass line 6 bypassing the fixed throttle 2, so that it does not interfere with the flow through the fixed throttle 2. It consists, for example, of a movable membrane 3b which is acted upon on one side by input-side high pressure, a valve spring 3c which, on the side facing away from the high pressure, presses against the membrane and a valve pin 3a which is mounted on the high-pressure side of the membrane 3b and blocks the bypass line 6 in the illustrated normal condition of the valve.

When the high pressure, which presses on the ring-shaped portion of the membrane left open by the valve pin 3a, as the effective high-pressure surface, threatens to exceed a permissible maximum value, which represents the opening pressure for the pressure control valve 3, the pressure control valve 3 opens up and thus, by way of the bypass line 6, causes the required high-pressure-side pressure reduction.

The pressure control valve 3 is constructed such that the back pressure, which is exercised by the pressure on the low-pressure side onto the valve pin head, influences the opening pressure only slightly. This is achieved by a corresponding coordination of this low-pressure-side effective valve head surface and the high-pressure-side effective membrane ring surface in connection with the valve spring 3c. The equilibrium of forces consisting of the high-pressure-side pressure force acting in the opening direction and the counterforces provided by the valve spring 3c, and the elasticity of the membrane itself is essentially responsible for the function of the pressure control valve 3. Thus, for example, a ratio of the effective high-pressure-side surface to the effective low-pressure-side surface of 1:10 can provide a useful result.

The valve unit of FIG. 1 can be used in an expansion element of a vehicle air conditioner, particularly a $CO_2$ air conditioner. It is found that, with such an expansion element, a satisfactory operation is achieved specifically also of a $CO_2$ air conditioner or an air conditioner with another refrigerant which, on the high-pressure side, operates at least temporarily in the supercritical range. The valve unit of FIG. 1 is then connected with its inlet side 4 to the outlet side of a condenser or gas cooler or an internal heat exchanger and is connected with its outlet side 5 to the inlet side of an evaporator of the air conditioner.

As the result of its fixed throttle 2, the valve unit provides, to an extent which is sufficient for many applications, an appropriate adjustment of the refrigerant high pressure as a function of the low-pressure-side refrigerant pressure. The refrigerant coming from the condenser/gas cooler flows in the normal operation when the pressure control valve 3 is closed via the fixed throttle 2, is throttled there (i.e. is relaxed) and flows by way of the valve outlet side 5 to the evaporator. An excessive rise of the refrigerant high pressure is prevented by the pressure control valve 3 which will then open and, for the purpose of reducing the pressure, will allow high-pressure-side refrigerant by way of the bypass line 6 while bypassing the fixed throttle 2 to flow to the low-pressure side.

Figure 2:
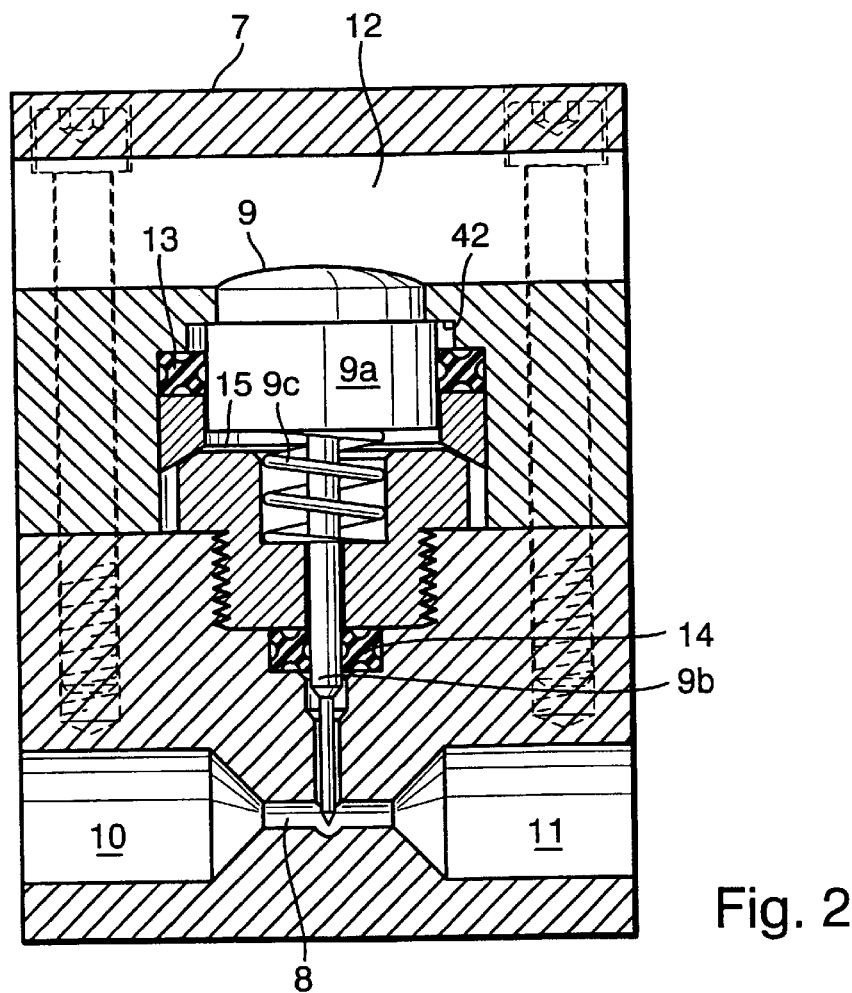
FIG. 2 is a longitudinal sectional view of a valve unit with a fixed throttle and a control valve influencing the latter.

The valve unit illustrated in FIG. 2 contains a fixed throttle 8 and a mechanical control valve 9, which influences the passage cross-section of the fixed throttle 9, in a common housing 7. The fixed throttle 8 is situated between a high-pressure-side inlet duct 10 and a low-pressure-side outlet duct 11. In addition, a pressure control valve can be provided in a bypass line bypassing the fixed throttle 8 between the valve high-pressure side 10 and the valve low-pressure side 11 and can be integrated in the valve housing 7 or may be implemented as an independent component.

The mechanical control valve 9 contains a control piston 9a which is acted upon by the pressure of a medium which exists in an associated pressure space formed by a flow duct 12 penetrating the valve housing 7. A valve needle 9b is connected with the pressure-operable control piston 9a and engages with its tip more or less far in the throttle duct of the fixed throttle 8, thereby to adjust its passage cross-section. A prestressed valve spring 9c exercises a counterforce upon the control piston 9a which is opposite to the pneumatic pressure force. Another counterforce, which, however, is virtually negligible in comparison to the above, acts pneumatically from the medium situated in the throttle duct of the fixed throttle 8 onto the tip of the valve needle 9b.

As long as the counterforces are larger than the pressure force exercised by the medium in the flow duct 12, the control piston 9a is held by the counterforces in the illustrated end position defined by a housing-side end stop 42. For sealing, an annular seal 13 surrounds the control piston 9a, and an annular seal 14 surrounds the valve needle 9b. These seals simultaneously carry out a movement-damping function. The opposite end position of the control piston 9a is defined by a lower stop 15 which is provided by a valve body of the control valve 9 which is fastened in an associated housing bore, and, as illustrated, may, for example, be screwed in, and is simultaneously used for guiding the valve needle 9b and for receiving the valve spring 9c.

The valve unit of FIG. 2 can also be used for an expansion element of an air conditioner. In particular, it can be used for an expansion element of a $CO_2$ air conditioner in order to adjust, at relatively low control-related expenditures, the refrigerant high pressure as closely as possible to the value for a maximal coefficient of performance (COP). In this type of use, the valve unit, in addition to a fixed-throttle normal operation, permits an influencing of the refrigerant high pressure as a function of the low-pressure-side refrigerant pressure, i.e., of the suction pressure, by way the control valve 9. For this purpose, the flow duct 12, which is connected with the control valve control piston 9 and which can also be a blind duct, is connected into the low-pressure side of the air conditioner, for example, between the evaporator and the compressor, in front of or behind the preferably existing internal heat exchanger. The high-pressure-side valve inlet duct 10 is connected to the outlet side of a condenser/gas cooler, and the low-pressure-side valve outlet duct 11 is connected to the inlet side of the evaporator.

In normal operation of the air conditioner, the refrigerant then flows by way of the valve inlet duct 10 to the fixed throttle 8, is throttled there (i.e., is relaxed) and by way of the outlet duct 11 reaches the evaporator. The refrigerant suction pressure acts in the valve flow duct 12 upon the control piston 9a. As soon as the suction pressure exceeds a defined lower limit value (for the refrigerant $CO_2$, for example, a value of 35 bar), the control piston 9a moves away from its upper stop 42, the valve spring 9c is compressed and the valve needle 9b closes a portion of the free fixed throttle cross-section so that the refrigerant high pressure rises.

With rising suction pressure, the valve needle 9b increasingly closes the free fixed throttle cross-section so that the refrigerant high pressure rises further. As soon as the suction pressure reaches a defined upper limit value (in the case of the refrigerant $CO_2$, for example, a value of 45 bar), the control piston 9a is placed against the lower end stop 15. The position of the valve needle 9b will then no longer change and the fixed throttle cross-section will also remain constant. For example, for a specific application, for a refrigerating capacity of approximately 5 kW, a refrigerant high pressure of 130 bar will occur in this situation.

The valve unit of FIG. 2 therefore acts as a fixed throttle up to a lower suction pressure limit value and, between the lower and the upper limit value, acts as a suction-pressure-dependent high pressure control valve. Above the upper suction pressure limit value, it again acts as a fixed throttle. This operating condition is estimated to exist for 90% of the operating cases. By way of this control characteristic, the air conditioner can be adjusted at low control expenditures sufficiently precisely for achieving a refrigerating capacity which is as high as possible and also for achieving a coefficient of performance COP which is as high as possible, specifically also in the case of a $CO_2$ air conditioner of a motor vehicle.

Figure 3:
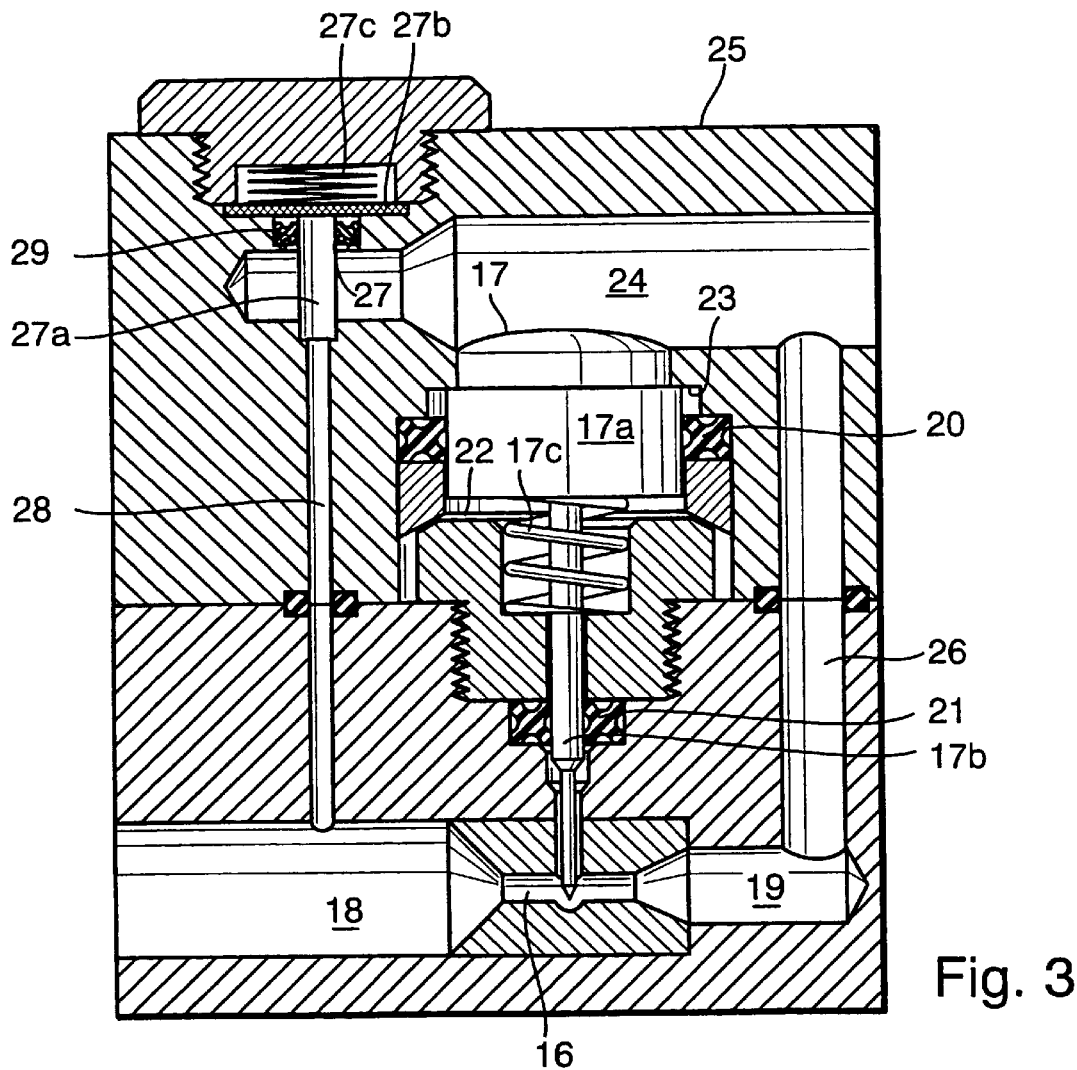
FIG. 3 is a longitudinal sectional view of a valve unit with a fixed throttle, a control valve influencing the latter and a pressure control valve.

FIG. 3 shows a valve unit which functionally largely corresponds to that of FIG. 2 and has a fixed throttle 16 and a control valve 17 which influences the passage cross-section of the fixed throttle 16. The fixed throttle 16 is again situated between a high-pressure-side valve inlet duct 18 and a low-pressure-side valve outlet duct 19. The mechanical control valve 17 is of a construction which is identical to that of FIG. 2, has a control piston 17a, a valve needle 17b, a valve spring 17c, and annular seals 20, 21 around the control piston 17a and the valve needle 17b. A valve body is inserted into a housing bore for guiding the valve needle 17b and for receiving the valve spring 17c as well as for fixing a lower end stop 22 for the control piston 17a which, on the other side, in the illustrated upper end position, rests against a housing-side stop 23. The control piston 17a is again connected with a pressure space; here, with a connection duct 24 which, like all other components of the valve unit, is situated in a common valve housing 25.

In contrast to the valve unit of FIG. 2, the outlet duct 19 of the valve unit of FIG. 3 branching off the fixed throttle 16 is connected by way of a housing-internal connection duct 26 with the connection duct 24, the pressure of the medium situated thereon acting upon the control piston 17a. As a result the mechanical control valve 17 is acted upon directly by the pressure of the relaxed medium coming from the fixed throttle 16, as the correcting variable. Otherwise, the method of operation of the control valve 17 corresponds to that of FIG. 2. That is, depending on the pressure existing in the connection duct 24, the control valve leaves the fixed throttle passage cross-section unchanged or limits it as a function of the connection duct pressure to a minimal value.

Furthermore, the valve unit of FIG. 3 contains a pressure control valve 27 which is integrated in the housing 25 and has a valve pin 27a which, in the illustrated normal valve operation, shuts off a bypass line 28 which directly connects the high-pressure side valve inlet duct 18 with the connection duct 24. The valve pin 27a is mounted on one side of the valve membrane 27b which is supported on its other side against a valve spring 27c. The valve pin 27a is surrounded by an annular seal 29 and, at its head end, is acted upon by way of the bypass line 28 by the pressure of the medium supplied on the high-pressure side by way of the valve inlet duct 18.

The valve unit of FIG. 3, can be used analogously to that of FIG. 2 for an expansion element, particularly of a $CO_2$ air conditioner. On the low-pressure side, this valve unit is connected with its connection duct 24 to the inlet side of the evaporator. That is, the mechanical control valve 17 is acted upon by the suction pressure of the refrigerant upstream of the evaporator, as the correcting variable. In addition, with respect to the method of operation of such an expansion element using the valve unit of FIG. 3, reference can be made to the corresponding above description of the operation of FIG. 2. In the embodiments of FIGS. 2 and 3, vibration tendencies of the mechanical control valve 9, 17 can be kept sufficiently low as the result of the damping behavior of the associated annual seals 13, 14 and 20, 21 as well as by the suitable selection of the spring characteristic of the pertaining valve spring 9c, 17c.

Figure 4:
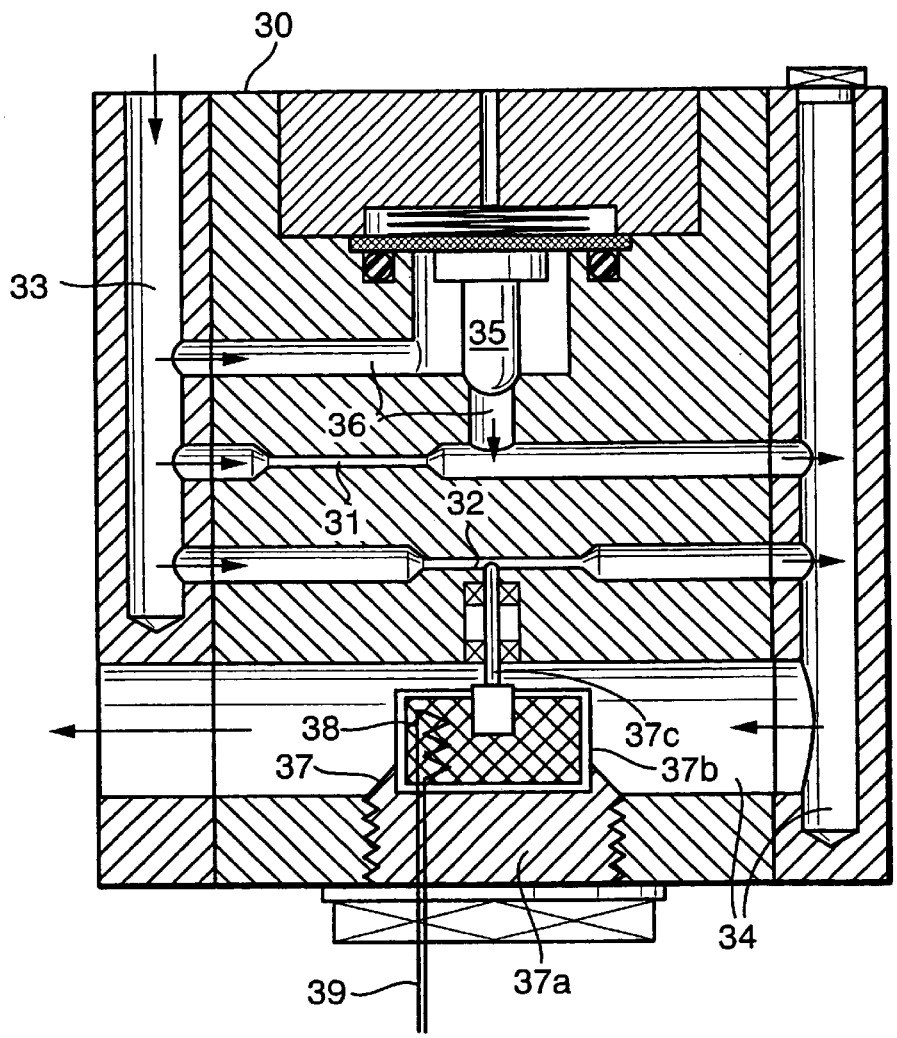
FIG. 4 is a longitudinal sectional view of a valve unit having two fixed throttles, a control valve influencing one fixed throttle and a pressure control valve.

FIG. 4 shows another valve unit which can be used for an air conditioner expansion element. In a common housing 30, this valve unit has a first fixed throttle 31 and a second fixed throttle 32 which are arranged in parallel between a high-pressure-side inlet duct 33 and a low-pressure-side outlet duct 34. A pressure control valve 35 is provided in a bypass line 36 bypassing one of the two fixed throttles 31. A thermal control valve 37 is provided to influence the passage cross-section of the second fixed throttle 32. With respect to its construction and method of operation, the pressure control valve 35 completely corresponds to that of FIG. 1, to which reference is made.

The thermal control valve 37 contains a basic body 37a which carries an expansion material container 37b. The expansion material container 37b is situated in the low-pressure-side outlet duct 34 of the valve unit and is filled with a suitable fluid, such as a wax-type substance, which assumes the temperature of the low-pressure-side medium in the outlet duct 34. As the correcting variable, this temperature determines by way of the volume expansion coefficient of the fluid in the expansion material container 37b the position of a valve needle 37c which is movably coupled to the expansion material container 37b and which, depending on the position, leaves the passage cross-section of the second fixed throttle 32 completely open or variably limits it to a complete closing. As a result, the high pressure occurring in the valve inlet duct 32 is influenced.

Furthermore, an electric heating element 38, such as a PTC element, for the thermal control valve 37 is provided in the expansion material container 37b. The heating element 38 can be energized by heating lines 39 which extend out of the expansion material container 37b and through the control valve basic body 37a to the exterior side of the housing 30 of the valve unit. As a result, the thermal control valve 37 can be externally controlled and thus be integrated in an externally provided control concept. In this case, in addition to the temperature of the medium in the valve outlet duct 34, the heating current or the physical quantity determining the latter, are used as the correcting variable for adjustment of the thermal control valve 37.

The valve unit of FIG. 4 is again particularly suitable for an expansion element of a $CO_2$ vehicle air conditioner. In this application, the valve unit is coupled by its inlet duct 33 on the high-pressure side to the outlet of the gas cooler or of the internal heat exchanger and is coupled by its outlet duct 34 to the low-pressure side of the $CO_2$ refrigerant circulating system in front of or behind the evaporator.

In normal operation, the refrigerant then flows from the gas cooler or the internal heat exchanger into the inlet duct 33 of the valve unit, is relaxed by way of the two parallel fixed throttles 31, 32, and flows via the outlet duct 34 to the evaporator. The refrigerant flow through the valve unit is symbolized by corresponding arrows. The pressure control valve 35 provides protection against an excessive refrigerant pressure on the high-pressure side. The thermal control valve 37 allows the refrigerant high pressure to be adjusted at relatively low control-related expenditures, in the different system operating conditions such that the coefficient of performance COP or the refrigerating capacity is as close as possible to its maximal value. In this case, the refrigerant high-pressure value is, on one hand, influenced by the low-pressure-side temperature of the relaxed refrigerant guided to the evaporator, in that the expansion material container 37b is situated in this refrigerant flow. The temperature, which the fluid assumes in the expansion material container 37b, corresponds to the saturation temperature of the refrigerant at the corresponding pressure.

As the low-pressure-side refrigerant pressure, i.e., the suction pressure, rises, and the temperature of the expansion material therefore rises, the valve needle 37c will increasingly close the free throttle cross-section of the second fixed throttle 32 so that the high pressure rises. As soon as the suction pressure has reached a defined upper limit value of, for example, 45 bar, the second fixed throttle 32 is closed while, by way of the other fixed throttle 31, the high-pressure-side refrigerant can continue to flow in a throttled manner to the low-pressure side. The position of the valve needle 37 will then no longer change as the suction pressure continues to rise, and, for a design example, at a defined refrigerating capacity of, for example, 5 kW, a pertaining high pressure value occurs of, for example, 130 bar.

By way of the expansion material container 37b, the low-pressure-side refrigerant temperature and the suction pressure which is again indirectly connected with it are used as a correcting variable for controlling the refrigerant high pressure. In addition, the heating current for the heating element 38 by way of the external heating lines 39 or a physical quantity determining it can be used as another correcting variable of this control. For this purpose, the ambient temperature of the vehicle or the rotational speed of the vehicle engine can, for example, be used, in which case a heating current signal is then generated which depends on one or both of these quantities.

Thus, for example, a two-step control can be provided as a function of the rotational engine speed, in which the thermal control valve 37 and thus the expansion element as a whole can be adjusted differently for a range of lower rotational engine speeds than for a range of high rotational engine speeds, whereby the rotational engine speed which, among other things, also determines the output of the air conditioning compressor can be taken into account. Vibration tendencies of the thermal control valve 37, which may occur under certain conditions during the operation of the air conditioner, can be counteracted by the suitable selection of the characteristics of the used expansion material in the expansion material container 37b.

As an alternative to the described insertion into the refrigerant flow section in front of the evaporator, the expansion material container 37b of the thermal control valve 37 can be arranged in the refrigerant flow section downstream of the evaporator. In this case, a valve unit is used which, compared to that of FIG. 4, is modified such that, corresponding to the valve unit of FIG. 2, the refrigerant flow duct influencing the control valve 37 is kept separate from the outlet duct coupled to the fixed throttles 31, 32. The outlet duct is then coupled to the evaporator inlet side, while the refrigerant flow duct of the valve unit influencing the thermal control valve 37 is connected in the refrigerant flow section between the evaporator and the compressor.

It is understood that, in addition to the illustrated examples, additional implementations of the expansion element according to the invention and of the valve unit according to the invention can be obtained. Thus, for example, an expansion element can be provided which contains as a relevant throttle element a pure control valve without a fixed throttle characteristic, which is acted upon by suction pressure or another physical quantity connected with the suction pressure, as the correcting variable for the purpose of controlling the high pressure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A valve unit usable for an air conditioner expansion element, comprising:
    a fixed throttle between a valve high-pressure side and a valve low-pressure side, and
    at least one control valve arranged to vary a passage cross-section of the fixed throttle.

2. The valve unit according to claim 1, wherein at least two parallel fixed throttles are operatively arranged between the valve high-pressure side and the valve low-pressure side.

3. The valve unit according to claim 2, wherein a pressure control valve is arranged in a bypass line bypassing the fixed throttles, and a control valve is operatively arranged to influence a passage cross-section of one of the fixed throttles.

4. The valve unit according to claim 1, wherein the throttle and the control valve are integrated into a common valve housing.

5. The valve unit according to claim 1, wherein the at least one control valve is a mechanical control valve arranged to be acted upon by pressure of a low-pressure-side medium as the correcting variable.

6. The valve unit according to claim 1, wherein the at least one control valve is a thermal control valve arranged to be acted upon by temperature of a low-pressure-side medium as the correcting variable.

7. The valve unit according to claim 1, wherein the at least one control valve is a thermal control valve having a position controllable by an externally heatable heating element.

8. A valve unit usable for an air conditioner expansion element, comprising:
    a fixed throttle between a valve high-pressure side and a valve low-pressure side, and
    at least one control valve arranged to vary a passage cross-section of the fixed throttle, which cross-section is always at least partially open, wherein the at least one control valve is a mechanical control valve arranged to be acted upon by pressure of a low-pressure-side medium as the correcting variable, and the control valve is operatively connected on the low-pressure side by a valve-housing-internal connection line with the valve low-pressure side.

9. An expansion element for an air conditioner having a refrigerant high-pressure side on an upstream thereof and a refrigerant low-pressure side on a downstream thereof, comprising:
    a control valve configured to adjust a flow cross-section of the refrigerant from the high-pressure side to the low-pressure side as a function of an effective correcting variable and to be acted upon by the refrigerant pressure on the low-pressure side or a physical quantity connected therewith as the correcting variable.

10. An expansion element for an air conditioner having a refrigerant high-pressure side on an upstream side thereof and a refrigerant low-pressure side on a downstream side thereof comprising a valve unit having:
    a fixed throttle between a valve high-pressure side and a valve low-pressure side, and
    at least one control valve arranged to adjust a passage cross-section of the fixed throttle, and configured to be coupled on the valve high-pressure side to a condenser, gas cooler or internal heat exchanger of the air conditioner and on the valve low-pressure side to a low-pressure-side refrigerant flow section of the air conditioner.

11. An expansion element for an air conditioner having a refrigerant high-pressure side on an upstream side thereof and a refrigerant low-pressure side on a downstream side thereof comprising a valve unit having:

a fixed throttle between a valve high-pressure side and a valve low-pressure side, and at least one control valve arranged to adjust a passage cross-section of the fixed throttle, which cross-section is always at least partially open, and configured to be coupled on the valve high-pressure side to a condenser, gas cooler or internal heat exchanger of the air conditioner and on the valve low-pressure side to a low-pressure-side refrigerant flow section of the air conditioner, wherein the control valve is arranged with a low-pressure control side thereof fluidically either between the expansion element and an evaporator of the air conditioner or between the evaporator and a compressor of the air conditioner, including in front of or behind an optionally existing internal heat exchanger 1.

* * * * *